United States Patent [19]

Fjelkner et al.

[11] Patent Number: 4,821,617
[45] Date of Patent: Apr. 18, 1989

[54] CUTTING OR RIPPING BLADE

[76] Inventors: Frans G. W. Fjelkner; Bo W. Fjelkner, both of Stierncornas väg 11, 161 53 Bromma, Sweden

[21] Appl. No.: 91,296

[22] Filed: Aug. 27, 1987

Related U.S. Application Data

[63] Continuation of Ser. No. 829,136, Dec. 31, 1985, abandoned.

[30] Foreign Application Priority Data

May 3, 1984 [SE] Sweden ............................... 8402383

[51] Int. Cl.[4] .............................................. B27B 33/08
[52] U.S. Cl. ...................................... 83/835; 83/667; 83/838; 51/209 R; 125/15
[58] Field of Search .................... 83/835, 855, 667; 51/209 R; 125/15

[56] References Cited

U.S. PATENT DOCUMENTS

| 212,813 | 3/1879 | Miller | 83/835 |
| 1,083,645 | 1/1914 | Wettstein | 83/835 |
| 3,981,216 | 9/1976 | Lemmon | 83/848 |
| 4,257,301 | 3/1981 | Tuomaala | 83/676 X |
| 4,407,178 | 10/1983 | Störzer | 83/835 |
| 4,574,676 | 3/1986 | Jansen-Herfeld | 83/835 |
| 4,584,220 | 4/1986 | Jansen-Herfeld | 83/838 |

FOREIGN PATENT DOCUMENTS 484988 3/1973 U.S.S.R. ............................... 83/835

Primary Examiner—Donald R. Schran
Attorney, Agent, or Firm—Burns, Doane, Swecker & Mathis

[57] ABSTRACT

A cutting blade (1) comprising a disc (2) intended for rotation and having attachment means arranged in its center of rotation (3') and teeth (5) or the like arranged on the periphery thereof. Formed in the disc (2) are slots (7, 8) or recesses which extend from the radially inward part (3) of the disc out towards its periphery (6) in a manner to form therebetween elongated disc-material sections (11, 11'). Arranged on one side of a line (12) which extends between the rotational center (3') and that part (11a) of the material section (11) facing the periphery is a zone (13), preferably a material zone, adapted when subjected to high load to take-up elastically, or substantially elastically, substantially all the changes in length and/or shape occurring primarily in the peripheral part (6) of the disc as a result of centrifugal forces, variations in heat etc.

5 Claims, 2 Drawing Sheets

CUTTING OR RIPPING BLADE

This application is a continuation of application Ser. No. 829,136, filed Dec. 31, 1985, now abandoned.

TECHNICAL FIELD

The present invention relates to a cutting blade and/or ripping blade, by which is meant a blade which cuts transversely to the longitudinal axis of a workpiece or a blade which cuts in the direction of said axis. For the sake of simplicity reference is made hereinafter, and in the claims, solely to a cutting blade, this term being meant to include any cutting tool which utilizes the characteristics peculiar to the invention, even when these characteristics are found incorporated in rotatable discs, such as grinding discs.

The invention relates more specifically, although not exclusively, to a circular cutting blade comprising a rotatable disc having centrally located attachment means and cutting teeth or the like arranged peripherally around the disc. In particular, the invention relates to such cutting blades as those in which grooves or recesses extend from the inner part of the disc out towards the periphery thereof in a manner to form elongated disc or material sections between mutually adjacent grooves or recesses.

BACKGROUND ART

A cutting blade comprising a circular disc having teeth located around the periphery thereof or around an edge portion thereof is known from the U.S. Pat. No. 1,083,645. Slots are formed in that part of the disc which is located between the inner part of the disc and the toothed peripheral edge part thereof.

The purpose of this design is to reduce the tendency of the blade to warp as a result of expansion of the toothed portion of the disc (changes in length) caused by frictional heat generated by contact of the teeth with the material being cut, and as a result of centrifugal forces acting on the peripheral portions of a rotating disc.

When the toothed peripheral edge portion of a cutting disc warps as a result of changed in length, the cutting groove in the material being worked becomes wider, which greatly impairs the economy, especially when ripping trees.

In the U.S. Pat. No. 1,083,645 it is proposed that slots shall be so formed in the blade parts located between the inner part of the blade and its peripheral edge part that intermediate blade or material sections have a curved configuration and are oriented approximately radially at their inner portions and extend outwardly therefrom to terminate tangentially with respect to the direction of rotation of the blade. According to the descriptive part of this specification the added purpose of this design is to transfer the drive force from the centre of the blade to the toothed edge portion thereof, through the agency of a substantially tangentially acting tensile force.

It is known to use in sawmills circular saw blades provided with hardmetal teeth inserts, so as to reduce wear of the blades and therewith reduce the number of stoppages required for blade changes. The saw blade normally has a diameter of from 0.7 to 1.2 meters, and the hardmetal inserts have a width which varies between 4 and 5 mm, while the thickness of the disc is between 3 and 4 mm.

As beforementioned, when in use the blade, and then primarily the radially outer parts of the blade, becomes hot, causing said peripheral blade parts to expand. This localised expansion of the blade promotes the risk of warping at the peripheral parts of the disc. Warping results in a wider cutting groove with a reduction in yield as a consequence thereof, and also in troublesome vibrations which may be so bad as to cause damage to the saw and equipment.

Other means have been proposed with the intention of reducing the warping tendencies of the toothed peripheral edge of a cutting blade caused by the concentration of heat in the peripheral areas of the blade when at work, and also the frictional heat generated by a warped blade in contact with the surfaces of the cutting groove Thermal extension of the central parts of the blade disc can be mentioned as an example of such means. No simple effective solution to the problem has been proposed, however.

DISCLOSURE OF THE INVENTION

Technical Problem

Consequently, a qualified technical problem in this respect is one of providing conditions in a cutting blade such that the blade will not warp as a result of use, or at least not to any appreciable extent, with subsequent risk of damage, substantially irrespective of the thermal expansion of the material at the toothed peripheral edge portion of the cutting disc.

Another qualified technical problem is one of providing conditions whereby while retaining a non-warping toothed peripheral blade edge portion, in spite of the heat generated at said edge portion, there can still be created conditions which enable the thickness of the disc to be reduced, and therewith also the width of the cutting groove. It is quite obvious that even a small reduction in the width of the cutting groove will result in a marked increase in yield from sawn logs or the like.

A further qualified technical problem in this regard is one of being able to create conditions and to take measures in connection with a rotatable cutting blade such that the blade disc and its peripheral edge portion are inherently stabilized by the centrifugal forces to which the disc is subjected upon rotation.

Still a further technical problem in view of what has been said above is one of being able to create conditions which enable a thin disc which has teeth provided around the periphery thereof to be subjected to powerful forces during a cutting operation.

Another technical problem in connection with a rotatable cutting blade is one of creating conditions such that the disc and its serrated peripheral edge portion obtain a stabilizing effect which increases in response to higher blade speeds and which is only slightly influenced by the cutting forces occurring during a cutting operation.

Another technical problem in this respect is one of providing a rotatable cutting blade which is so constructed that it can be rotated more rapidly than present day blades, so as to obtain greater stability in rotation without being subjected to heavy vibrations, and therewith enable greater working rates or feed rates to be achieved.

A further technical problem is one of providing conditions whereby the cutting disc of a rotatable cutting blade can be made thinner than the discs of prior art cutting blades and which enables the diameter of the disc to be increased, thereby enabling larger logs to be cut or ripped with or against the grain, and the rate of feed to be increased.

A further technical problem is one of readily forming the disc or material sections between adjacent slots so that they obtain a well adapted configuration and so that said sections are able to absorb cutting forces, such as tensile and compression forces, generated during a cutting action.

One technical problem which is isolated from those problems cited above is one of providing such conditions that the mutually facing surfaces of the slots formed in the cutting disc are so arranged as to prevent displacement of one material section at right angles to the plane of the disc so as to be free from adjacent material sections, and so that the sections are oriented and guided relative to one another.

A further technical problem is one of providing conditions which, in the event of one material section being slightly displaced laterally in relation to an adjacent section, ensure that no outwardly projecting edge is able to engage the material being worked.

A further technical problem is one of providing conditions which enable slots formed in the disc to be filled with means or material capable of taking-up solely small forces, such that one disc section is unable to move at right angles to the plane of the disc and be free from an adjacent disc section, but such that said sections are oriented and guided in relation to one another.

Finally, it will be understood that a further technical problem in this art is one of enabling narrow hardmetal cutting bits to be attached to a still thinner disc in a durable and effective manner, since such attachment is already difficult and troublesome to achieve with discs of conventional sizes.

SOLUTION

The present invention relates to a cutting blade, and more specifically although not exclusively to a circular cutting blade, comprising a rotatable cutting disc; attachment means located at a centre of rotation of the disc; cutting teeth or like means arranged peripherally around the disc; and slots or recesses which extend from the inner part of the disc out towards the periphery thereof in a manner to form therebetween elongated material sections forming part of said disc.

In accordance with the invention there is provided on one side of the line extending between the centre of rotation and those parts of the elongated material sections which face the periphery of the disc at least one zone, preferably a material zone, so adapted as to be able to take-up elastically, or substantially elastically without, or substantially without, lateral deformation substantially all changes in length and/or shape, primarily in the peripheral portion of the disc, occurring as a result of the centrifugal forces, changes in temperature etc., to which the disc is subjected in operation.

In accordance with one suitable embodiment of the invention the cutting disc is provided with a plurality of thin slots, the respective lengths of which are preferably just short of half the radius of a full disc.

The slots are conveniently formed, either totally or in part, by forming a varying angle other than a right angle to the plane of the disc. An advantage is afforded when the slot angle varies periodically towards the aforesaid zone, or vice versa.

In accordance with one embodiment of the invention the aforesaid zone is located at a distance from the centre of rotation or the edge part of the disc corresponding approximately to less than half the disc radius.

Conveniently, the zone comprises a rotatable attachment.

In accordance with the invention there is suitably provided means which, in the event of lateral displacement of a material section relative to an adjacent material section, is effective in preventing an outwardly projecting edge from engaging the material being worked.

Means are also suitably provided for preventing appreciable relative displacement of mutually adjacent material sections in the plane of the disc.

Finally, means are also provided which enable narrow hardmetal cutting inserts to be mounted effectively to a thinner disc.

ADVANTAGES

Those advantages primarily characteristic of a cutting blade constructed in accordance with the present invention reside in the creation of conditions which enable changes in length in the peripheral edge part of the disc caused by centrifugal forces and heat variations to be readily taken-up, by providing in the vicinity of the inner part of the disc a specific, elastic zone, thereby providing conditions which enable the thickness of the cutting disc and the teeth to be reduced and the diameter and speed of the cutting blade to be increased without changes in length in the peripheral edge part of the cutting disc resulting in troublesome warping of the disc and/or in giving rise to vibrations.

The primary characterizing features of a cutting blade in accordance with the present invention are set forth in the characterizing clause of the following claim 1.

BRIEF DISCLOSURE OF THE DRAWINGS

An embodiment presenting the characteristic features of the present invention and at present preferred will now be described in more detail with reference to the accompanying drawings, in which FIG. 1 is a plan view of a circular cutting blade having a plurality of slots which extend from a radially inward part of the blade out towards a toothed peripheral edge portion thereof and which are formed in accordance with the present invention;

Figure 4:
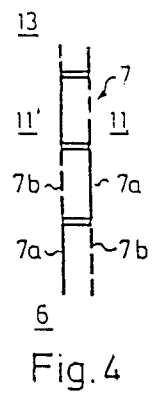
FIG. 4 is an enlarged plan view of a first slot form intended to enable orientation of mutually facing edge surfaces of the slot to be oriented so that one material section cannot be displaced to any appreciable extent in relation to a further material section at right angles to the plane of the disc.
Figure 5:
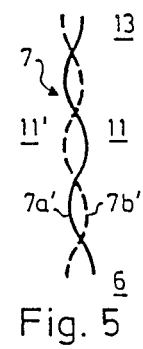
Figure 6:
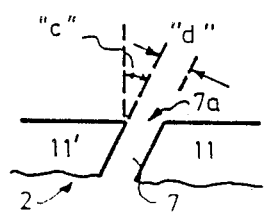
Figure 7:
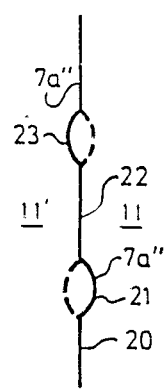
Figure 8:
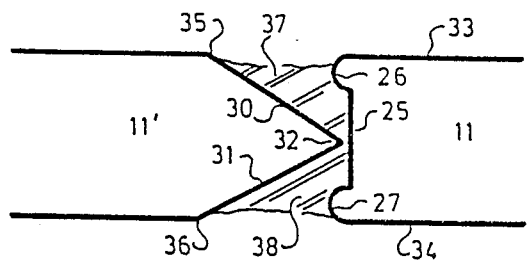

FIG. 5 an enlarged plan view of a second slot form intended to enable mutually facing edge surfaces of the slot to be oriented in a manner such that one material section is unable to move to any appreciable extent in relation to a further material section at right angles to the plane of the disc;

FIG. 6 is a sectional view of a slot having the wave form ill in FIGS. 4 and 5;

FIG. 7 is an enlarged plan view of a third slot form intended to enable orientation of mutually facing edge surfaces of the slot in a manner such that one material section is unable to move to any appreciable extent in relation to the other material section at right angles to the plane of the disc;

FIG. 8 is an enlarged sectional view of an alternative slot; and

Figure 9:
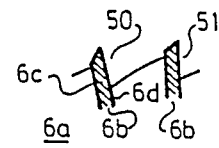

FIG. 9 is a plan view of part of the peripheral edge portion of the disc illustrating the attachment of hard-metal teeth.

DESCRIPTION OF AN EMBODIMENT AT PRESENT PREFERRED

Figure 1:
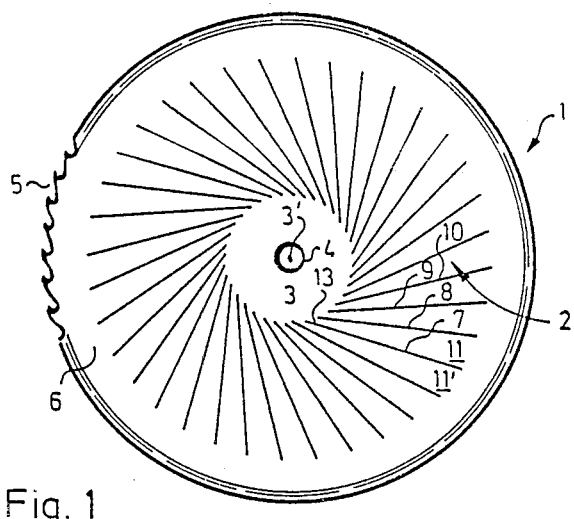

In FIG. 1 the reference 1 identifies generally a circular cutting blade which comprises a rotatable disc 2 having arranged in a centre of rotation 3' thereof attachment means 4, in the form of a hole, for mounting the blade 1 on a shaft not shown. The blade also comprises a plurality of peripheral teeth 5, which advantageously have the form of hardmetal teeth. Formed in the disc are a plurality of slots ; which extend from the radially inward part 3 of the disc 2 out towards the toothed peripheral edge portion 6 thereof, of which slots only four, 7,8,9 and 10, are referenced. The slots are uniformly distributed around the disc 2 and the illustrated embodiment incorporates thirty-six such slots. The slots define therebetween elongated disc-material sections, of which one such section 11 is shown between the mutually adjacent slots 7,8. Since the remaining material sections are identical only the material section 11 and the adjacent material section 11' will be described here.

In the embodiment of FIG. 1 the slots 7,8 are straight and are oriented substantially tangentially to the radially inward part 3 of the disc 2 and extend substantially radially to the peripheral part 6 of the disc.

Figure 2:
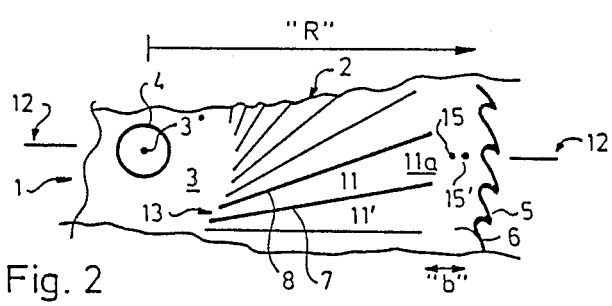
FIG. 2 is a plan view, in larger scale, illustrating elongated sections located between mutually adjacent slots in accordance with the present invention.

As will be seen more clearly from FIG. 2, there is arranged in accordance with the invention on one side of a line 12 extending between the centre of rotation 3' and a part a zone 13, preferably at least one material zone, which is 11a of the material section 11 facing the peripheral part 6 so adapted that when subjected to high load it is able to take-up completely elastically or at least substantially elastically, without or substantially without lateral deformation, all changes in length and/or shape, primarily in the peripheral edge part 6 of the disc, caused by centrifugal forces and heat variations etc.

The invention takes as its starting point the fact that the load or stress in the zone 13 is high, and in particular extremely high, but still lies within the elastic properties of the material. The scope of the invention also embraces the eventuality that the load will exceed the elastic range and transcend to the plastic range, i.e. the range in which the material is "substantially elastic". The reference here to "large angular changes" shall not be taken as absolute but shall be related to previously known angular changes occurring when cutting discs are subjected to load, these changes being extremely small and hardly measurable.

In accordance with the invention the disc 2 is provided with a plurality of extremely narrow and thin slots 7,8, 9 and 10, the length of which preferably lies within a range corresponding to just less than half the radius of the blade as a whole.

The zone 13 is located at a distance from the rotational centre 3' of the disc or from the teeth 5 corresponding substantially to less than half the disc radius. For example, this distance may vary from 0.2–0.5 times the disc radius "R".

In accordance with the invention the toothed peripheral edge portion 6 can suitably be made as narrow or thin as possible and the slots 7,8,9 and 10 may extend radially as far as possible, although practical experience shows that the peripheral portion 6 shall be capable of guiding and holding the teeth 5. Consequently, the width "b" of the peripheral portion 6 and its relationship to material thickness is a question of balance with regard to the choice of disc material, the rotational speed of the disc, the forces which can be expected to occur during a cutting operation, and the tensile forces occurring in the material sections.

Similarly, the positioning of the zone 13 and the size of said zone is a question of balance between the choice of material forming said zone, the disc thickness, the width of the zone, and the movements and forces which can be expected in operation as a result of prevailing temperature variations and variations in centrifugal forces.

In order to enable mutually facing surfaces of mutually adjacent material sections to be located adjacent one another even when the peripheral portion 6 and/or the actual material section is, or are, placed under tension, it is proposed that respective slots shall be formed, either completely or in part, in a manner to form a varying angle other than a right angle to the plane of the disc. It is particularly proposed that the slot angle varies periodically in a direction away from the peripheral portion 6 and towards the material zone 13, or vice versa.

Figure 3:
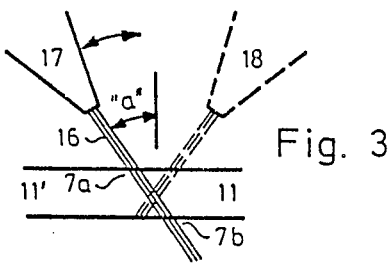
FIG. 3 is a strongly schematic side view of a device at present proposed for forming the slots; in the disc.

In the embodiment illustrated in FIG. 3 this is effected by cutting the slot" 7 and the groove 8 with the aid of a laser beam 16 or the like which, when forming said groove 7, is caused to move, for example, from the peripheral portion 6 towards the radially inward part 3 of the disc while forming a varying angle "a" with the disc 2, the position of the laser beam 16 being varied between the position 17 shown in full lines in FIG. 3 and the position 18 shown in broken lines therein. In the case of a groove having the configuration illustrated in FIG. 4, the upper straight section line 7a will be constantly displaced laterally relative to the lower section line 7b within certain portions.

FIG. 5 illustrates an alternative in which the laser beam is allowed to swing between its terminal positions 17 and 18 and where the momentary angular value is established periodically in dependence on the position of the laser beam between the peripheral portion 6 of the disc and the radially inward part 3 thereof.

In this case, the upper section line 7a' obtains, for example, a sinusoidal shape while the lower section line 7b' obtains a counter-phase sinusoidal shape.

In respect of the two sections lines illustrates in FIGS. 4 and 5 it is applicable that one part in one material section when laterally displaced will lock a corresponding part in an adjacent material section and therewith create conditions as will be evident from FIG. 6, such that the one material section 11 is able to move at right angles to the plane of the disc in relation to an adjacent material section 11' through a distance which is dependent upon the slot width "d" and the incident angle "c" in question.

The features of the present invention are illustrated more clearly in FIG. 2, in which it is assumed that a point 15 on the toothed peripheral edge portion 6 of the disc is caused to move to a position 15' as a result of changes in length and/or shape caused by centrifugal forces and particularly variations in heat, this displacement enabling the aforesaid changes to be transmitted to and taken-up in the zone 13 without resulting in warping. It is important that the zone 13 is so formed and so situated in relation to the rotational centre 3' that the maximum assumed displacement of the point 15' a the peripheral portion 6 will require elastic, or substantially completely elastic deformation in the zone 13, so that the peripheral edge portion 6 can return substantially to its earlier position upon cessation of the aforesaid forces and/or displacements.

The width of the slot 7 s suitably extremely small and in practice is preferably from 0.2–0.4 mm in respect of the slot forms illustrated in FIGS. 4 and 5. In slots with joint material the width can be increased to 2–10 mm, preferably about 5 mm.

It should be noted in particular that the present invention can also be utilized quite generally to stabilize a disc which is intended for rotation and which has attachment means located in the centre of rotation of said disc, and in which there is formed in the disc slots or recesses which extend from the radially inward part thereof out towards the disc periphery in a manner to form between mutually adjacent slot elonaged disc-material sections.

It is proposed that there is provided in such a disc intended for stable rotation on one side of a line extending between the rotational centre of the disc and that part of the material section facing the periphery at least one zone, preferably a material zone, adapted when subjected to high load to take-up elastically, or substantially elastically, without or substantially without lateral distortion substantially all changes in length occurring primarily in the peripheral portion 6 of the disc and caused by centrifugal forces and possibly variations in heat etc.

Conveniently, the slits or slots 7 and 8 may be caused to terminate in the vicinity of the zone 13 and/or the vicinity of the peripheral portion 6 in a circular hole, a wider opening or in an additional angular slit or slot. This will reduce the concentration of stresses at the ends of respective grooves and creates conditions for easier movement between the portion 11a and the peripheral portion 6 or alternatively the zone 13 and the radially inward part 3.

The width and thickness of the peripheral portion 6 or the distance between the teeth 5 and the portion 11a are primarily selected with the intention of taking-up tensile forces caused by rotation and forces caused when cutting material in the direction of its longitudinal axis, i.e. ripping wood, and to withstand the impact forces occurring, for example, when sawing through nails, while the distance between the rotational centre 3' and the zone 13 is selected in dependence on the material used and in dependence on the tensile forces and the torque occurring in the zone 13 upon displacement of the point 15 to the point 15'.

Consequently, with a cutting blade constructed in accordance with the present invention lateral stability is primarily obtained automatically through the centrifugal forces acting on the peripheral portion 6. The changes in length and/or shape caused by variations in heat at the peripheral portion of the disc will primarily be taken-up in the vicinity of the zone 13, where complete elastic deformation caused by a relatively small force is preferred, so that the deformed part can return to its original state.

Thus, it is here a question of conducting resultant deformation tendencies away from the periphery of the disc to specific zones located, for example, in the vicinity of the centre of the disc.

FIG. 7 is a plan view in much larger scale of a third slot form, in which a slot part 20 has a section line which extends at right angles to the plane of the disc 11, 11', a part 21 has a section line according to a part of that illustrated in FIG. 5, a part 22 has a section line extending at right angles to the plane of the disc 11, 11', and a part 23 has a section line according to a further part of the slot configuration illustrated in FIG. 5, etc., etc. Thus, the section line 7a'' comprises a straight part 20, a right-hand curve 21, and a straight part 22 and a left-hand curve 23.

FIG. 8 is a sectional view of an alternative slot form.

In this slot form the section surface 25 of the material section 11 extends at right angles to the plane of the material with laterally oriented promontories 26,27, while the section surface 30,31 of the material section 11' forms a point 32. The point 32 of the material section 11' is prevented from passing beyond the plane-parallel defining surfaces 33,34 of the material section 11 by the promontories 26,27.

Both of the aforesaid material sections may be provided with mutually opposing pointed parts.

When the surfaces 30 and 31 are caused to face in the direction of rotation, there is eliminated any tendency of the edge surface 35,36 to fasten in material being cut in its axial direction, e.g. in the direction of the grain with respect to wood.

In accordance with the invention there is provided in the space between the section surface 25 and the section surfaces 30,31 a joint or filling material 37,38 which seals-off the interspaces formed. This material may be slightly elastic, such as lightmetal, plastics, putty and like materials.

In this case, the distance between the parts 11 and 11' may be made somewhat greater and mutually facing surfaces in particular may have the perpendicular but totally penetrating sectional surface illustrated in principle in FIG. 8 with respect to the part 11.

In principle it lies within the scope of the invention to form the central part 3 of the cutting blade from one or more centre plates and to form the zones 13 from rivets or like fasteners to which those parts of the material sections 11 and 11' facing the radially inward part 3 are attached.

The slot 7 and/or the slot 8 in the part 11a of the material section can be provided with an angle-forming slot, a recess or the like so as to obtain easier movement in the part 11a relative to the peripheral portion 6.

A zone similar to the zone 13 may also be positioned in the
vicinity of the part 11a.

The disc may be produced with varying thickness and/or with smaller thickness or from a different material in the zone 13 than in the remainder of the disc 2.

The zone 13 may, in one and the same disc, be formed from a plurality of concentric rings.

FIG. 9 illustrates an embodiment at present preferred which enables thin hardmetal cutting inserts to be mounted on the peripheral edge portion of a disc which is thin in itself. Both the hardmetal inserts and the disc may be thinner than the inserts and discs of prior art cutting blades.

To this end the edge portion 6a of the illustrated disc is provided with a groove 6b adapted to accommodate a hardmetal insert 50 and 51 respectively. In this way there is formed a support 6c enabling the cutting insert 50 to be brazed to the rim of the cutting disc. The length of the support edge 6d preferably corresponds to approximately 25% of the length of the support section 6c.

It will be understood that the aforedescribed embodiments do not limit the scope of the invention and that modifications can be carried out within the scope of the invention as illustrated in the following claims.

We claim:

1. A cutting blade comprising a disc for rotation and having attachment means arranged in a center of rotation and provided around its periphery with teeth or like elements, said disc has provided therein slots arranged so as to form between mutually adjacent slots disc-material sections wherein;
   (a) the slots extend from a point located substantially adjacent a peripheral edge of the disc in a direction toward the center of the disc said slots being oriented substantially tangentially to a zone defined concentrically to said center;
   (b) the respective disc-material sections located between said slots converge toward the center of the disc and define said zone concentrically adjacent said center, said material section absorbing substantially all of tensile and compressive forces generated during high load operation;
   (c) said zone provided, upon occurrence of said high load, to take-up elastically substantially all changes in shape occurring primarily in the peripheral edge of the disc substantially without permanent shape deformation;
   (d) the disc material section separated from an adjacent material section by said slot having a width substantially in the range of 0.2–0.4 mm; and
   (e) each of the zones, one for each material section defines a portion of a circle concentric with respect to the center of the disc.

2. A cutting blade comprising a disc for rotation and having attachment means arranged in a center of rotation and provided around its periphery with teeth or like elements, said disc has provided therein slots arranged so as to form between mutually adjacent slots disc-material sections;
   (a) the slots extending from a point located substantially adjacent a peripheral edge of the disc in a direction toward the center of the disc and to one side thereof;
   (b) the respective disc-material sections located between said slots converge toward the center of the disc and define said zone adjacent said center;
   (c) said zone provided, upon occurrence of high load, to take up elastically substantially all changes in shape occurring primarily in the peripheral edge of the disc substantially without permanent shape deformation;
   (d) the disc-material section separated from an adjacent material section by said slot having a predetermined width; and
   (e) each of the zones, one for each material section defines a portion of a circle concentric with respect to the center of the disc and wherein, between two mutually adjacent material sections separated from one another by said slot, means are provided for restricting the bending of each material section relative to an adjacent material section, therewith stiffening the blade.

3. A cutting blade according to claim 1, wherein the longitudinal extension of the slots or grooves lies within the range of approximately half the radius of the disc.

4. A cutting blade according to claim 1, wherein the distance of the zone from the rotational center or edge portion of the disc corresponds approximately to less than half the radius of the disc.

5. A cutting blade according to claim 1, wherein the material zones have a width which increases towards the disc periphery.

* * * * *